United States Patent [19]

Sakurai

[11] Patent Number: 5,530,743
[45] Date of Patent: Jun. 25, 1996

[54] TELEPHONE EXCHANGE APPARATUS AND TONE SENDING METHOD IN TELEPHONE EXCHANGE APPARATUS

[75] Inventor: Shigeki Sakurai, Yokohama, Japan

[73] Assignee: Canon Kabushiki Kaisha, Tokyo, Japan

[21] Appl. No.: 974,203

[22] Filed: Nov. 10, 1992

[30] Foreign Application Priority Data

Nov. 14, 1991 [JP] Japan .................................. 3-326494

[51] Int. Cl.⁶ ...................................................... H04M 3/06
[52] U.S. Cl. ........................... 379/257; 379/283; 379/418; 379/231
[58] Field of Search .................... 379/58, 59, 27, 379/93, 102, 97, 62, 60, 202, 283, 256, 386, 231, 400, 382, 235, 377, 418, 375, 100, 114, 116, 119, 135, 257, 269, 290

[56] References Cited

U.S. PATENT DOCUMENTS

5,185,738  2/1993  Kelly ............................. 379/269
5,249,220  9/1993  Moskowitz et al. ............. 379/100

*Primary Examiner*—Jeffery Hofsass
*Assistant Examiner*—Scott Wolinsky
*Attorney, Agent, or Firm*—Morgan & Finnegan

[57] ABSTRACT

In a telephone exchange apparatus for performing exchange processing by a memory time switch, first tone signals are generated, and second tone signals are generated by sequentially exchange-controlling the memory time switch in synchronism with the zero-crossing points of the generated first tone signals. Furthermore, when the second tone signals are sent to corresponding output time slots, the switching operation is performed in synchronism with the zero-crossing points of the second tone signals, so that high-quality tones including no harmonic component can be sent to an extension telephone set or to another system through an outside line.

17 Claims, 10 Drawing Sheets

TELEPHONE EXCHANGE APPARATUS AND TONE SENDING METHOD IN TELEPHONE EXCHANGE APPARATUS

BACKGROUND OF THE INVENTION

The present invention relates to a telephone exchange apparatus for performing exchange processing and a tone sending method in the telephone exchange apparatus.

As a conventional telephone exchange apparatus, for example, an apparatus constituted by a tone generator for generating first tone signals, and a memory time switch for generating second tone signals by sequentially exchanging the first tone signals generated by the tone generator, and sending the second tone signals to corresponding output time slots is known.

Figure 6:
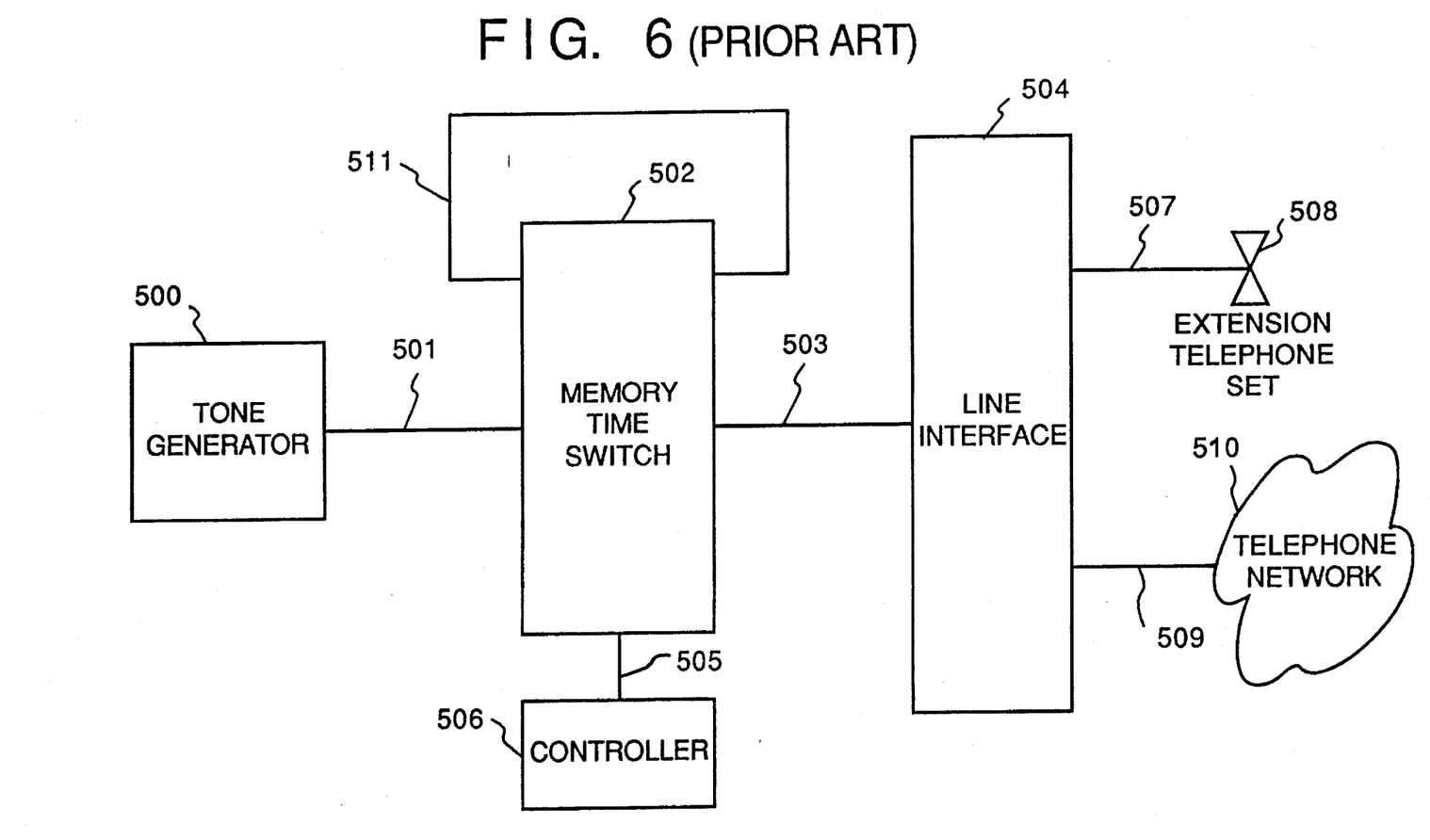
FIG. 6 is a block diagram showing an arrangement of a conventional telephone exchange apparatus.

FIG. 6 is a block diagram showing an example of such a conventional telephone exchange apparatus.

In FIG. 6, a tone generator 500 for generating first tone signals is connected to a memory time switch 502 through a PCM highway 501.

A line interface 504 accommodates an extension telephone set 508 through an extension line 507. The line interface 504 is connected to a telephone network 510 through a line 509, and is further connected to the memory time switch 502 through a PCM highway 503.

A controller 506 controls the entire system, and is connected to the memory time switch 502 through a signal line 505.

An operation for generating second tone signals based on the first tone signals by switching the memory time switch 502 in the conventional telephone exchange apparatus with the above-mentioned arrangement will be described below.

The first tone signals generated by the tone generator 500 are continuously sent onto the highway 501. The controller 506 generates second tone signals based on the first tone signals sent from the highway 501 by switching a connection of the memory time switch 502. The generated second tone signals are sent onto a PCM highway 511 and are input to the memory time switch 502 again.

Figure 7:
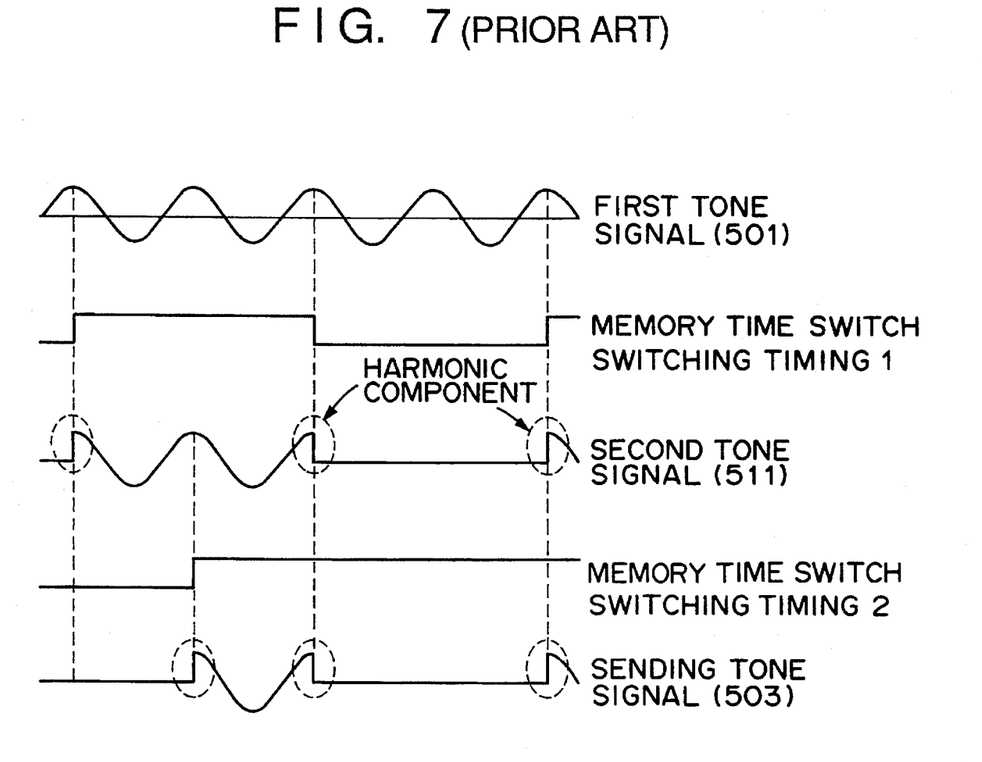
FIG. 7 is a waveform chart showing tone signals generated in the conventional apparatus shown in FIG. 6.

FIG. 7 is a waveform chart showing waveforms of conventional tone signals in the above-mentioned memory time switch 502.

The conventional controller 506 controls the memory time switch 502 through the signal line 505 so as to generate the second tone signals based on the first tone signals. Therefore, the switching time may often coincide with the peak level of the first tone signal. When there is a switching timing 1 which coincides with the peak level of the first tone signal, the second tone signal becomes a signal including a harmonic component at the switching timing. The second tone signal in this case corresponds to a waveform (511) shown in FIG. 7.

The controller 506 also performs control for sending the second tone signals generated in this manner to the line interface 504. The tone signals are sent to the line interface 504 by switching the memory time switch 502. Therefore, at this switching timing 2, a signal (503) including a harmonic component is also generated and sent, as indicated by a "sending tone signal" in FIG. 7.

As described above, in the prior art, the second tone signals are generated by switching the first tone signals at random timings. For this reason, the smooth first tone signal including only a frequency component in an audio band (0.3 to 3.4 kHz) is disconnected at random timings. For this reason, the amplitude of the second tone signal upon disconnection has a random value, and the second tone signal includes a harmonic component depending on the amplitude value at that time.

The second tone signals generated by the memory time switch 502 are randomly switched by returning them to the memory time switch 502 so as to generate the sending tone signals, and the sending tone signals are sent to corresponding time slots. For this reason, the second tone signals are further converted to signals including harmonic components, and the converted signals are sent.

Therefore, the prior art provides an apparatus having poor tone quality and sending unnecessary noise to an extension telephone set or to another system through, e.g., an outside line, and an operator feels discomfort.

SUMMARY OF THE INVENTION

The present invention has been made to eliminate the above-mentioned conventional drawbacks, and has as its object to provide a telephone exchange apparatus which can send a high-quality tone free from noise.

More specifically, it is another object of the present invention to provide a telephone exchange apparatus, which can switch second tone signals in synchronism with zero-crossing points by sequentially exchange-controlling an exchange switch in synchronism with the zero-crossing points of first tone signals, and can generate smooth signals including only a component in an audio band.

It is still another object of the present invention to provide a telephone exchange apparatus, which can send a high-quality tone including no harmonic component to an extension telephone set or to another system through an outside line in such a manner that the second tone signals are switched in synchronism with their zero-crossing points when they are sent to corresponding output channels.

As means for achieving the above objects, the present invention comprises the following arrangement.

More specifically, a telephone exchange apparatus for performing exchange processing, comprises first tone generation means for generating a first tone signal, zero-crossing point signal generation means for generating a signal indicating a zero-crossing point, and conversion means for converting the first tone signal into a second tone signal on the basis of the zero-crossing point signal.

In addition, for example, the apparatus further comprises sending request signal generation means for generating a sending request signal of a tone signal, and signal synchronization means for synchronizing the sending request signal generated by the sending request signal generation means with the zero-crossing point signal. The conversion means converts the first tone signal into the second tone signal on the basis of the signal synchronized by the signal synchronization means.

A telephone exchange apparatus for performing exchange processing using an exchange switch, comprises first tone generation means for generating a first tone signal, zero-crossing point signal generation means for generating a signal indicating a zero-crossing point, sending request signal generation means for generating a sending request signal of a tone signal, signal synchronization means for synchronizing the sending request signal with the zero-crossing point signal, and control means for generating a second tone signal by controlling the exchange switch on the basis of the signal synchronized by the signal synchronization means.

With the above-mentioned arrangement, when the exchange switch is controlled in synchronism with the zero-crossing points of the first tone signals, all the second tone signals can be switched at zero-crossing points. For this reason, the second tone signals can be generated as smooth signals including only a component in the audio band.

Since the second tone signals are switched in synchronism with their zero-crossing points when they are sent to corresponding output time slots, high-quality tones including no harmonic component and not causing an operator to feel discomfort can be sent.

Other objects of the present invention will be apparent from the following description of the embodiment.

DETAILED DESCRIPTION OF THE PREFERRED EMBODIMENTS

The preferred embodiments of the present invention will be described in detail hereinafter with reference to the accompanying drawings.

[First Embodiment]

Figure 1:
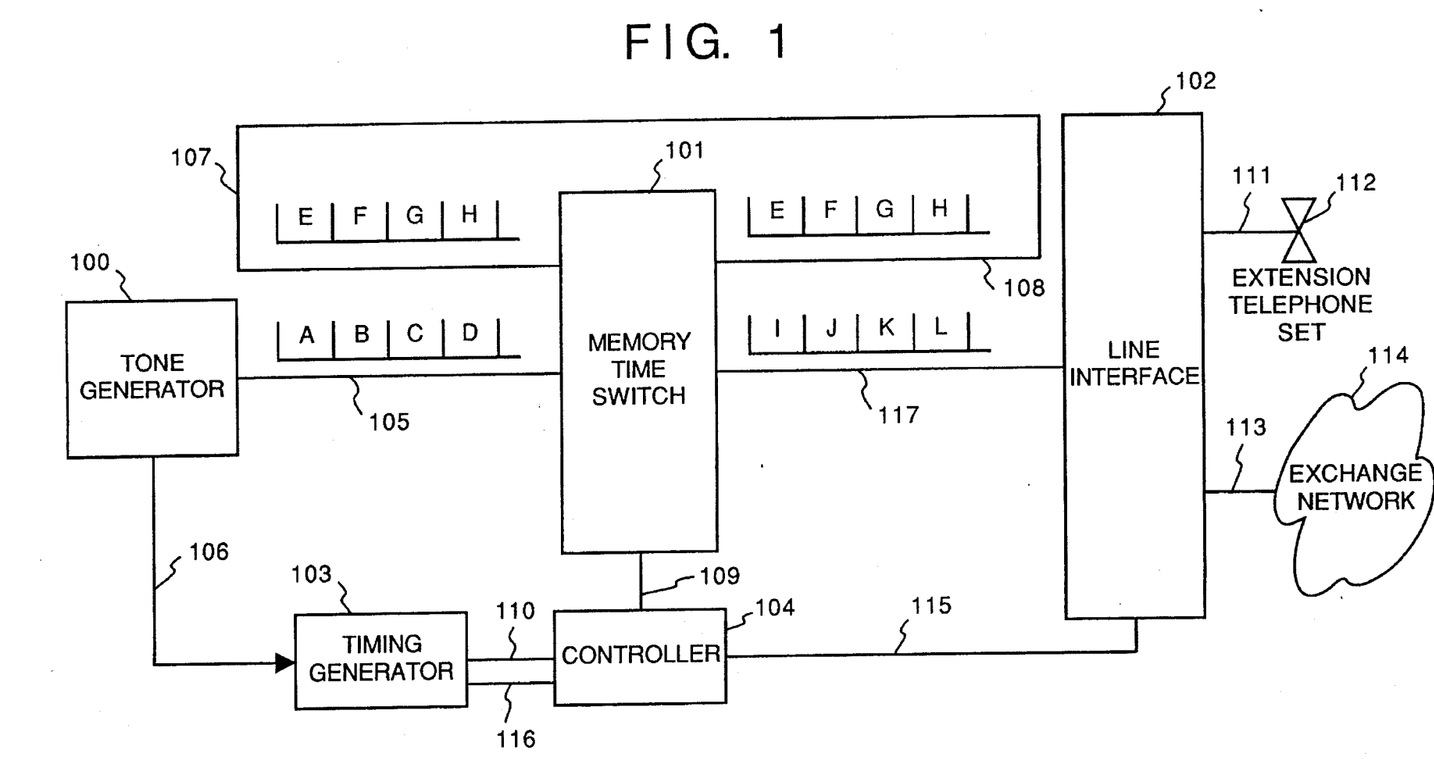
FIG. 1 is a block diagram showing an arrangement according to the first embodiment of the present invention.

FIG. 1 is a block diagram showing an arrangement of a telephone exchange apparatus according to the first embodiment of the present invention.

In FIG. 1, a tone generator 100 for generating first tone signals is connected to a memory time switch 101 through a PCM highway 105. The tone generator 100 outputs the generated first tone signals to the memory time switch 101 through the PCM highway 105.

An output PCM highway 108 of the memory time switch 101 is directly connected to an input PCM highway 107.

A line interface 102 is connected to the memory time switch 101 through a PCM highway 117. Furthermore, the line interface 102 accommodates an extension telephone set 112 through an extension line 111, and is connected to an exchange network 114 through a line 113.

A timing generator 103 is connected to the tone generator 100 through a signal line 106, and is also connected to a controller 104 through signal lines 110 and 116. The timing generator 103 supplies a plurality of timing signals generated on the basis of the zero-crossing points of the first tone signals to the controller 104.

The controller 104 performs the control operation of the entire system. For example, the controller 104 controls the memory time switch 101 through a signal line 109, and controls the line interface 102 through a signal line 115.

Figure 2:
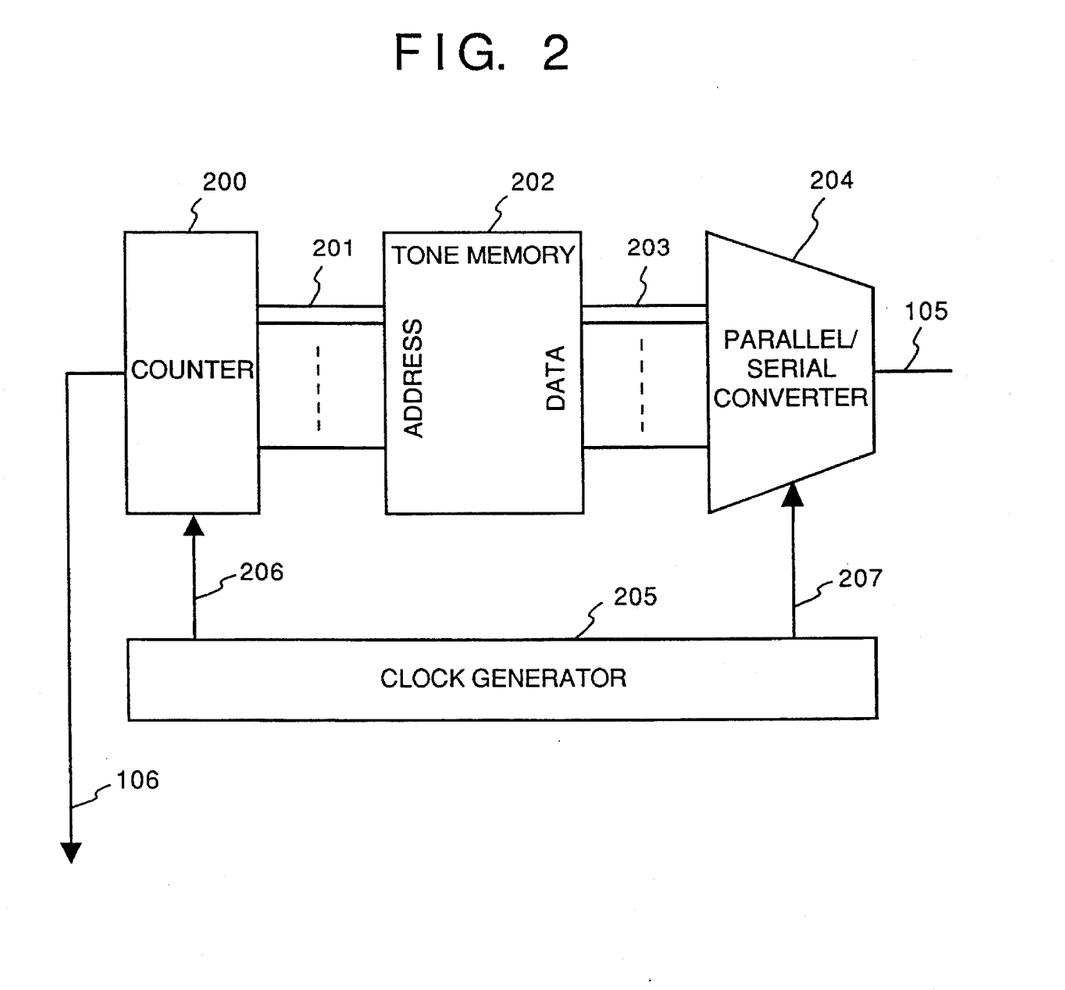
FIG. 2 is a block diagram showing an arrangement of a tone generator of the first embodiment.

FIG. 2 is a block diagram showing the details of the arrangement of the tone generator 100 of this embodiment.

In FIG. 2, a counter 200 is connected to an address input of a tone memory 202 through a signal line 201. The tone memory 202 stores PCM codes representing 32 different signals having a period of 100 msec. PCM codes corresponding to addresses designated by the counter 200 are sequentially read out from the tone memory 202, and are sent to a parallel/serial converter 204 through a signal line 203. The PCM codes converted into serial data by the parallel/serial converter 204 are sent to the memory time switch 101 through the highway 105.

A clock generator 205 supplies timing clock signals to the counter 200 and the parallel/serial converter 204.

The operation of the tone generator 100 with the above-mentioned arrangement will be described in detail below with reference to the timing chart of FIG. 3.

A signal having a period of 100 msec obtained by the tone memory 202 is constituted by 800 frames, and one frame is 125 μs (8 kHz). Each frame is constituted by "0" to "31", i.e., 32 time slots. Therefore, when corresponding time slots are extracted in units of frames, and are decoded at 8 kHz, a corresponding analog signal can be obtained.

Figure 3:
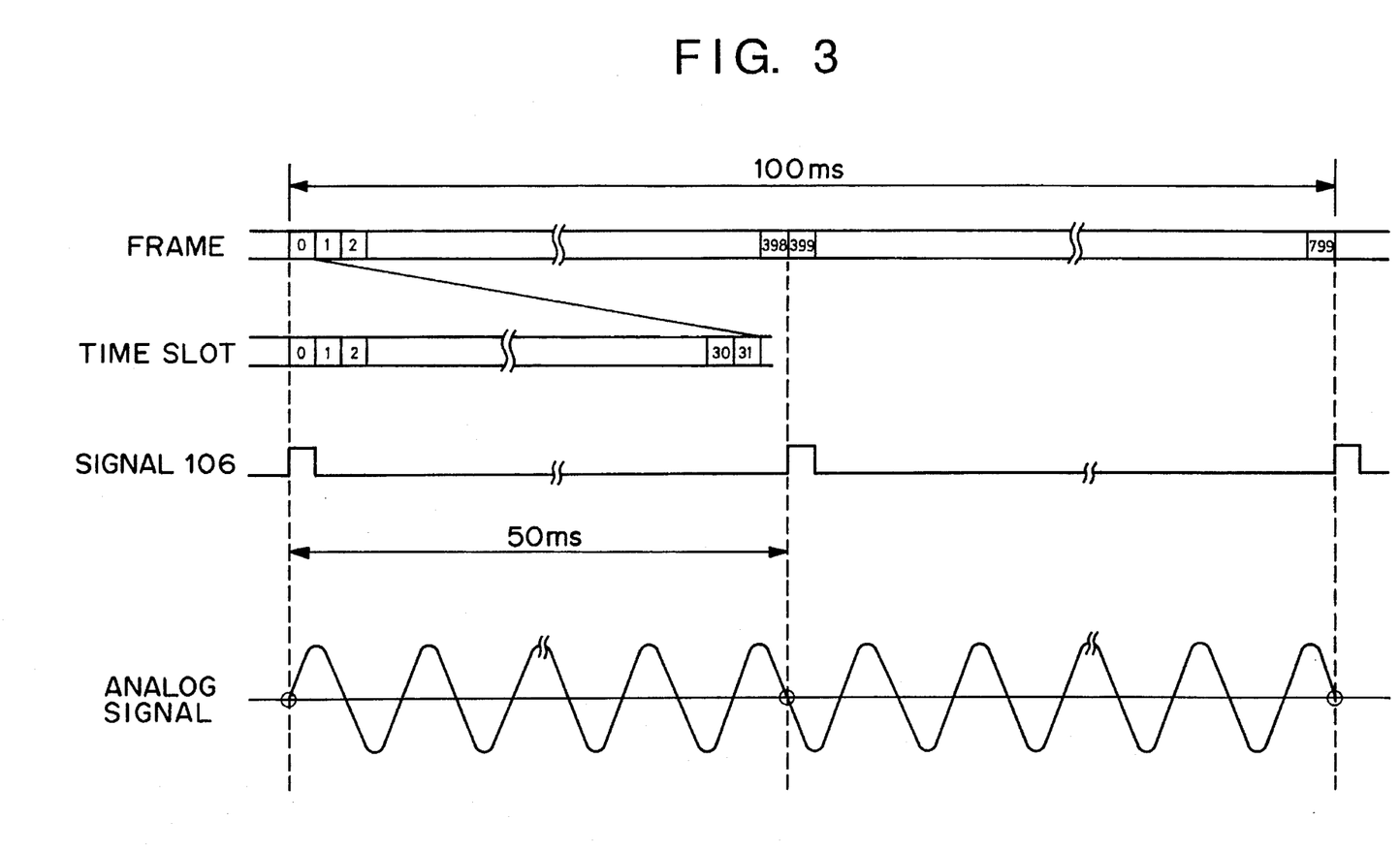
FIG. 3 is a timing chart showing an operation of the tone generator in the first embodiment.

For example, an analog signal shown in the lowermost portion of FIG. 3 is obtained by extracting signals in time slots "0" of the frames "0", "1", "2", . . . , "799", and decoding these signals at 8 kHz. When the signals in the time slots "1" to "31" are similarly decoded, a total of 32 different signals having a period of 100 msec can be obtained.

The counter 200 continuously and alternately sends address values corresponding to the frames and the time slots to the tone memory 202. For this reason, each of the 32 different signals is a signal having a period of a maximum of 100 msec.

In this embodiment, zero-crossing points common to the total of 32 different signals in the time slots "0" to "31" are assigned to the frames "0" and "399". Therefore, all the decoded analog signals become 0V at the two points, i.e., the frames "0" and "399".

An output signal 106 from the counter 200 is a signal representing these zero-crossing points, and is output when the counter 200 represents the frames "0" and "399". More specifically, in this embodiment, the signal representing the zero-crossing points from the counter 200 is generated for one frame (125 μs) at a 50- msec interval, and is sent to the timing generator 103 through the signal line 106.

The timing generator 103 generates timing signals necessary for switching-controlling the memory time switch 101, and supplies them to the controller 104 so as to generate a second tone signal. The timing generator 103 can desirably generate timing signals necessary for the system. In this embodiment, the timing generator 103 generates two different timing signals, i.e., a signal 110 having a period of 500 msec (2 Hz) and a signal having a period of 250 msec (4 Hz) in synchronism with the output signal 106 from the counter 200.

An operation for generating a second tone signal in this embodiment will be described below with reference to FIGS. 1, 4, and 5.

Note that a case will be exemplified below wherein the tone generator 100 generates four different tone signals A, B, C (silence), and D, as shown in FIG. 1, and sends them onto the PCM highway 105.

In this case, the first tone signals A, B, C, and D are input to the memory time switch 101 through the PCM highway 105. The controller 104 controls the memory time switch 101 according to the flow chart shown in FIG. 5.

Figure 4:
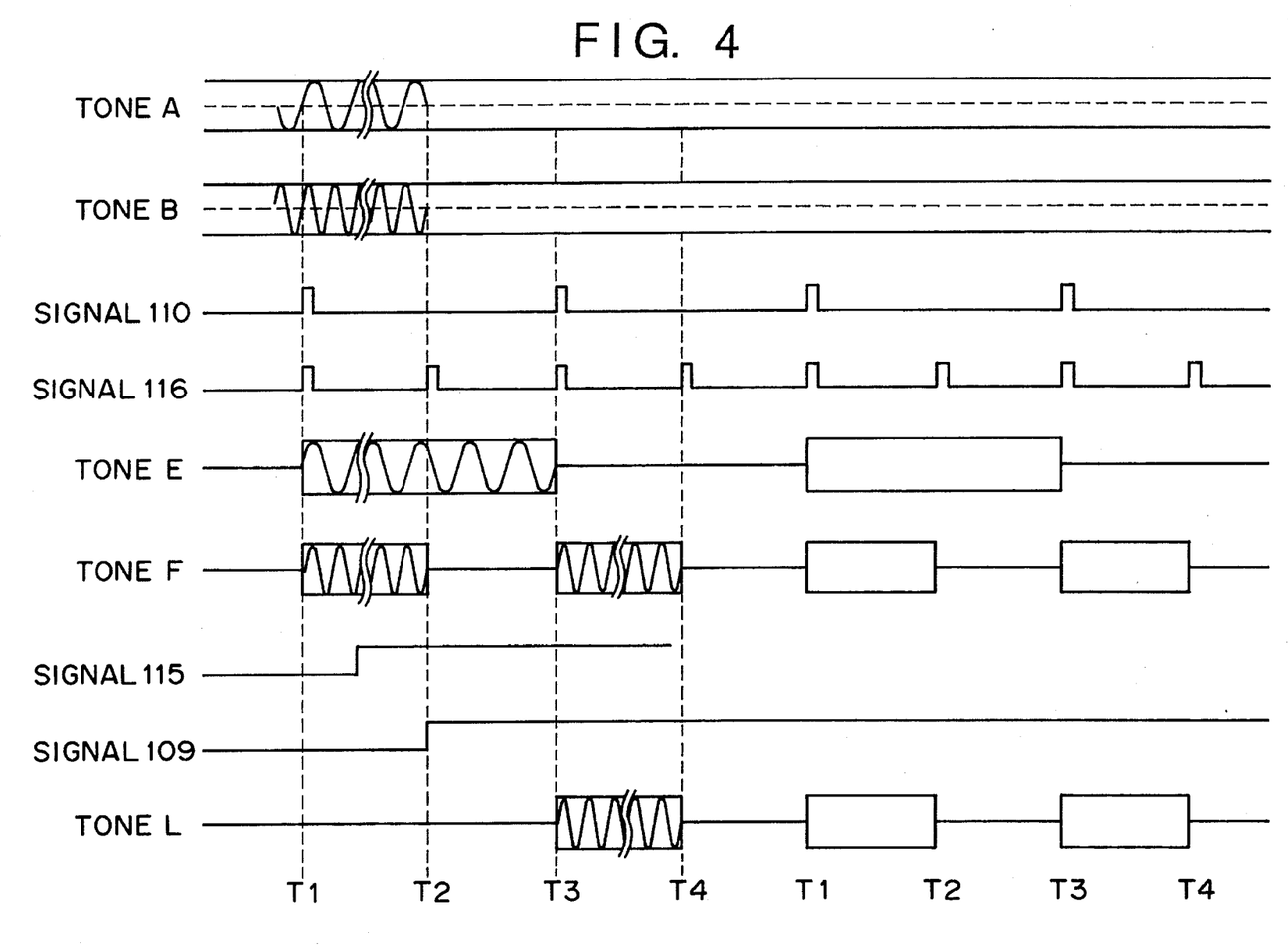
FIG. 4 is a timing chart showing a generation operation of second tone signals in the first embodiment.

$T_1$, $T_2$, $T_3$, and $T_4$ shown in FIG. 4 are timings for changing the type of first tone signal, and these timings are generated by the controller 104 on the basis of interruption of signals 110 and 116 supplied from the timing generator 103.

Figure 5:
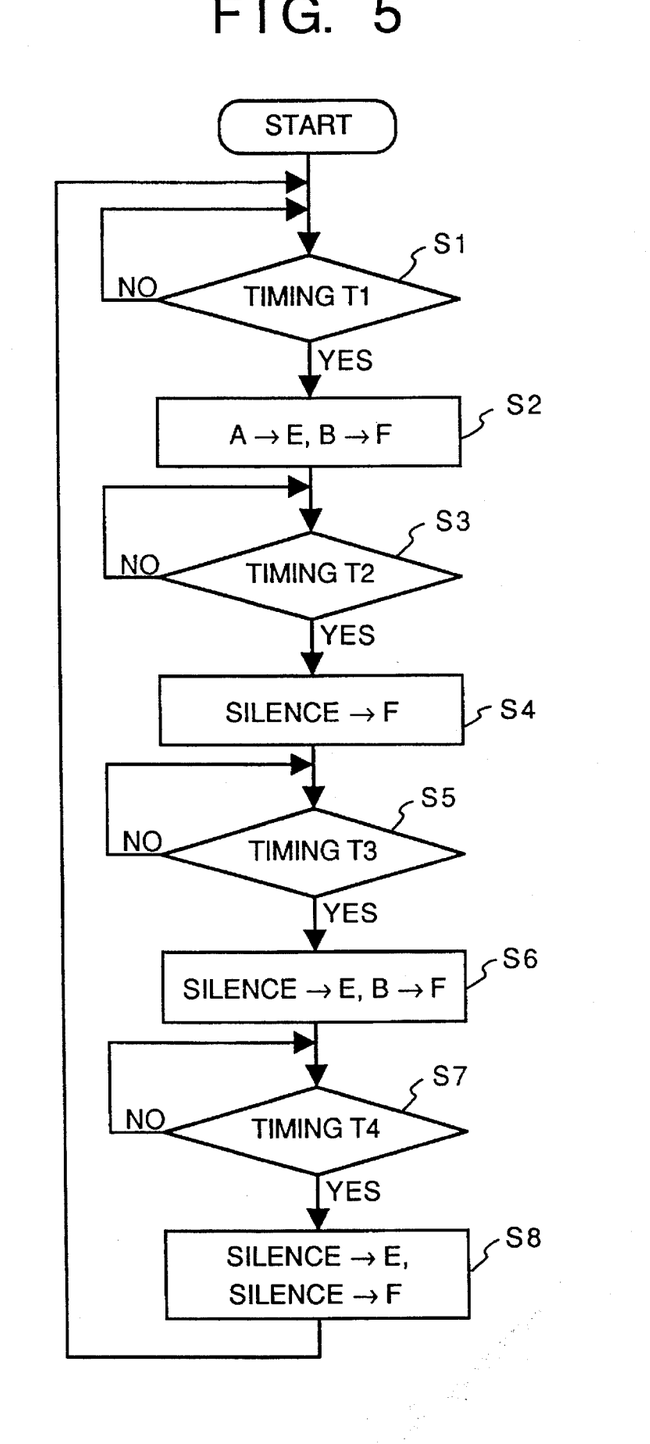
FIG. 5 is a flow chart showing the generation operation of the second tone signals in the first embodiment.

Note that A→E in step S2 in FIG. 5 means that the first tone signal A is set to be connected to a second tone signal E on the PCM highway 108, and B→F means that the first tone signal B is set to be connected to a second tone signal F on the PCM highway 108. The same applies to steps S4, S6, and S8.

Referring to FIG. 5, the controller 104 receives the 2-Hz signal 110 and the 4-Hz signal 116 from the timing generator 103 to confirm that the timing $T_1$ has been reached (step S1). In step S2, the controller 104 executes processing operations A→E and B→F. More specifically, the first tone signal A is set to be connected to the second tone signal E, and the first tone signal B is set to be connected to the second tone signal F.

Then, the controller 104 receives the 4-Hz signal 116 from the timing generator 103 and waits until it confirms that the timing $T_2$ is reached (step S3). When the controller 104 confirms that the timing $T_2$ has been reached, the flow advances to step S4, and the controller 104 controls the memory time switch 101 as in step S2 to execute processing silence (tone signal C)→F. More specifically, the first tone signal C is set to be connected to the second tone signal F.

Similarly, the controller 104 receives the 2-Hz signal 110 and the 4-Hz signal 116 from the timing generator 103 and waits until it confirms that the timing $T_3$ is reached (step S5). When the controller 104 confirms that the timing $T_3$ has been reached, the flow advances to step S6 to execute processing operations silence (tone signal C)→E and B→F. Similarly, when the controller 104 receives the 4-Hz signal 116 and confirms that the timing $T_4$ has been reached (step S7), it executes processing operations silence (tone signal C)→E and silence (tone signal C)→F in step S8.

After the timing $T_4$, the flow returns from step S8 to step S1 to execute processing for waiting for the timing $T_1$. Thereafter, the controller 104 repeats this control operation.

As a result of the above-mentioned processing, as shown in FIG. 4, the tone signal E is generated from the tone signal A, and the tone signal F is generated from the tone signal B. In this case, since the switching timings $T_1$, $T_2$, $T_3$, and $T_4$ coincide with the zero-crossing points of the tone signals A and B, the tone signals E and F start from zero-crossing points, and end at zero-crossing points.

The second tone signals sent onto the PCM highway 108 are input to the memory time switch 101 again through the input PCM highway 107.

An operation for sending the second tone signals input to the memory time switch 101 again through the input PCM highway 107 to the line interface 102 by the memory time switch 101 will be described below.

The signal line 115 also serves as a signal line for sending a connection request signal of a tone signal to the extension telephone set 112 or the exchange network 114 from the line interface 102 to the controller 104. The controller 104 starts an operation for sending the second tone signals to the line interface 102 in response to the connection request signal of the tone signal from the line interface 102. For example, the line interface 102 sends a signal for requesting dial tones to the controller 104 according to an off-hook operation of the extension telephone set 112.

In this case, when the controller 104 receives the connection request signal in the middle of the tone signal F, it does not immediately perform connection control of the memory time switch 101, but performs the connection control in synchronism with the timing signal 116 from the timing generator 103. More specifically, the second tone signal F is connection-controlled at the timing $T_2$, and is set to be connected to a tone signal I on the output PCM highway 117 to the extension telephone set 112 or the exchange network 114.

As described above, according to this embodiment, the timing generator 103 generates timings necessary for connection exchange on the basis of the signals 106 indicating the zero-crossing points of the tone signals from the tone generator 100. The controller 104 switches the memory time switch 101 at the zero-crossing points of the tone signals on the basis of the timing signals from the timing generator 103.

Therefore, second tone signals which start from zero-crossing points and end at zero-crossing points can be generated. Furthermore, since the controller 104 performs connection switching of the memory time switch 101 for sending the second tone signals to the line interface 102 on the basis of the timing signals from the timing generator 103, second tone signals which start from zero-crossing points and end at zero-crossing points can be generated in response to sending requests generated at random timings.

Thus, smooth tone signals free from unnecessary noise can be sent.

Note that the present invention can be applied to an exchange apparatus which simultaneously performs generation of second tone signals and a sending operation of the second tone signals to the line interface in addition to the above-mentioned embodiment.

[Second Embodiment]

The second embodiment of the present invention will be described below.

Figure 8:
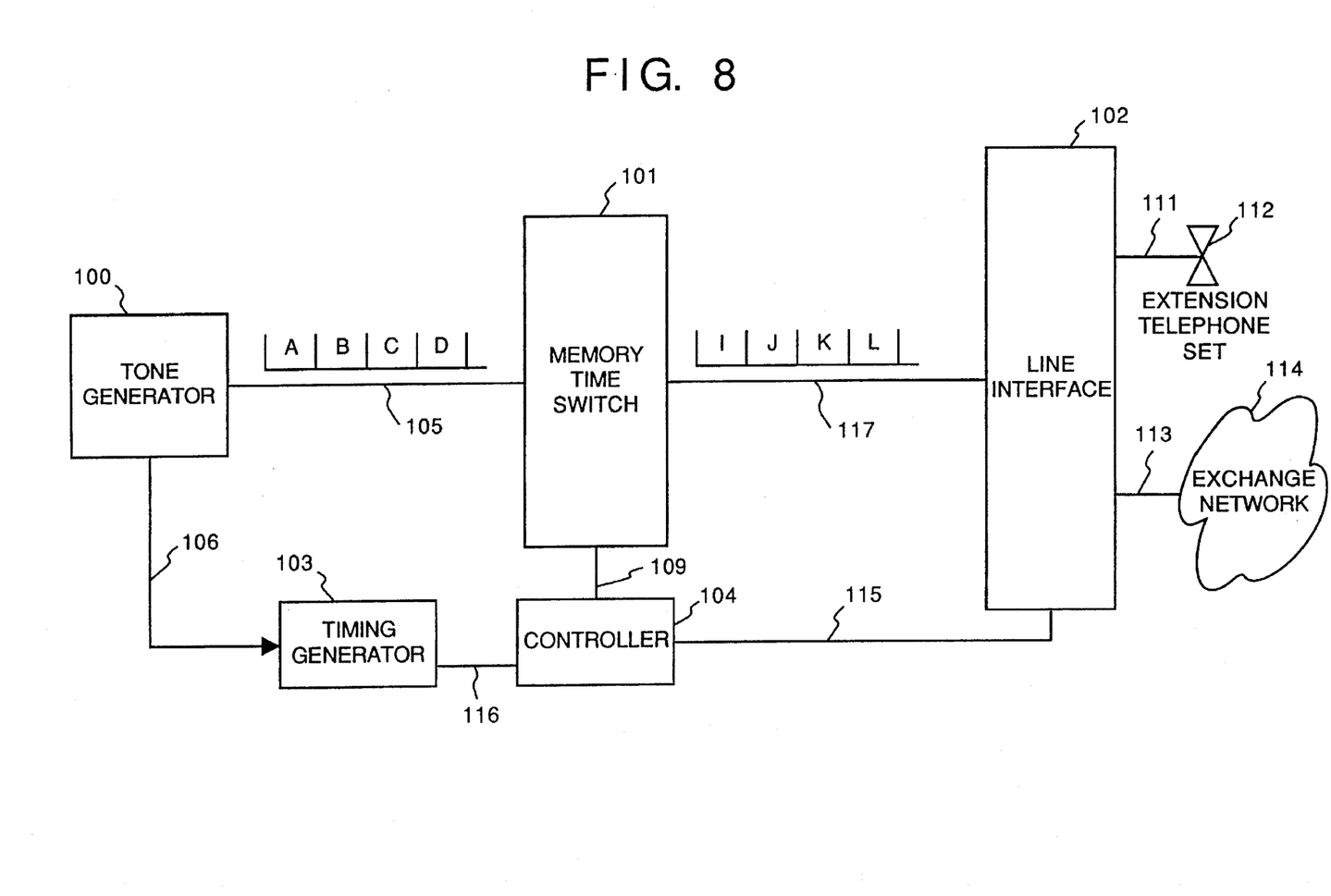
FIG. 8 is a block diagram showing an arrangement according to the second embodiment of the present invention.

FIG. 8 is a block diagram showing an arrangement according to the second embodiment of the present invention. Note that the same reference numerals in FIG. 8 denote the same parts as in FIG. 1, and a detailed description thereof will be omitted. In the second embodiment, a case will be exemplified below wherein a tone generator 100 generates four different tone signals A, B, C, and D, as shown in FIG. 8, and sends them onto a PCM highway 105.

The first tone signals A, B, C, and D from the tone generator 100 are input to a memory time switch 101 through the PCM highway 105.

Figure 9:
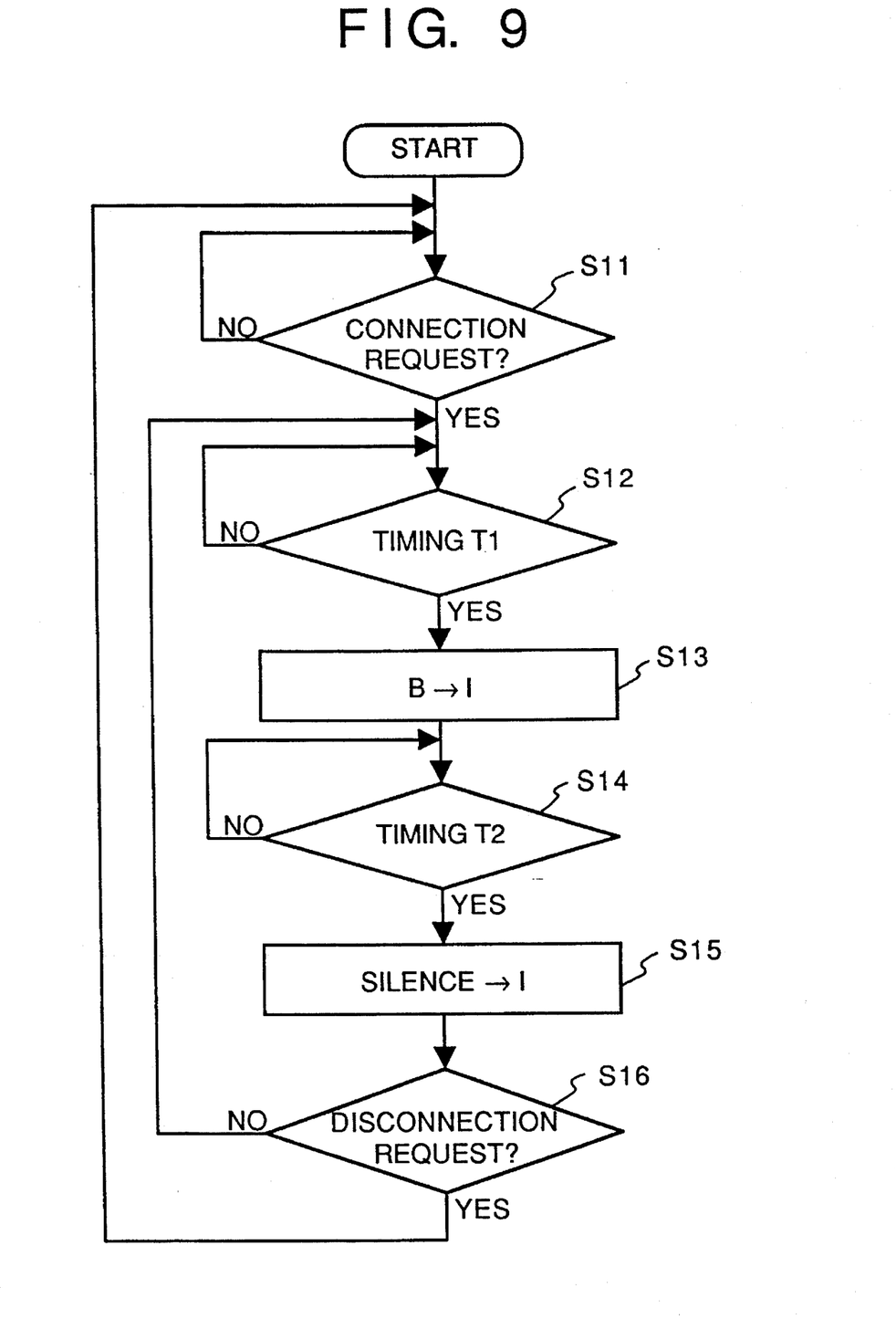
FIG. 9 is a flow chart showing a generation operation of second tone signals in the second embodiment.

A controller 104 controls the memory time switch 101 according to the flow chart shown in FIG. 9. Note that B→I in step S13 in FIG. 9 means that the first tone signal B is set to be connected to a time slot I of a PCM highway 117. $T_1$ and $T_2$ are the timings for changing the type of first tone signal, and these timings are generated by the controller 104 on the basis of interruption of a signal 116 supplied from a timing generator 103.

In FIG. 9, the controller 104 monitors reception of a connection request signal 115 (which is generated according to, e.g., an off-hook operation of an extension telephone set 112) from the line interface 102 in step S11. When the connection request signal 115 is received, the controller 104 confirms the connection request, and the flow advances to step S12. In step S12, the controller 104 monitors the signal 116 received from the timing generator 103. Upon reception of the signal 116, the controller 104 confirms that the timing $T_1$ has been reached, and the flow advances to step S13. In step S13, the controller 104 executes processing B→I. With the above-mentioned processing, the first tone signal B is set to be connected to the time slot I of the PCM highway 117 to the line interface 102.

In step S14, the controller 104 monitors the next signal 116 received from the timing generator 103. Upon reception of the next signal 116, the controller 104 confirms that the timing $T_2$ has been reached, and the flow advances to step S15 to execute processing silence (tone signal C)→I.

Thereafter, it is determined in step S16 if a disconnection request (generated according to, e.g., a dial data input from the extension telephone set 112) from the line interface 102 is received. If the disconnection request is not received, the flow returns to processing for waiting for the timing $T_1$ in step S12. Thereafter, this control operation is repeated.

When the disconnection request from the line interface 102 is received, a series of processing operations are ended, and the flow returns to step S11 to monitor the next connection request.

Figure 10:
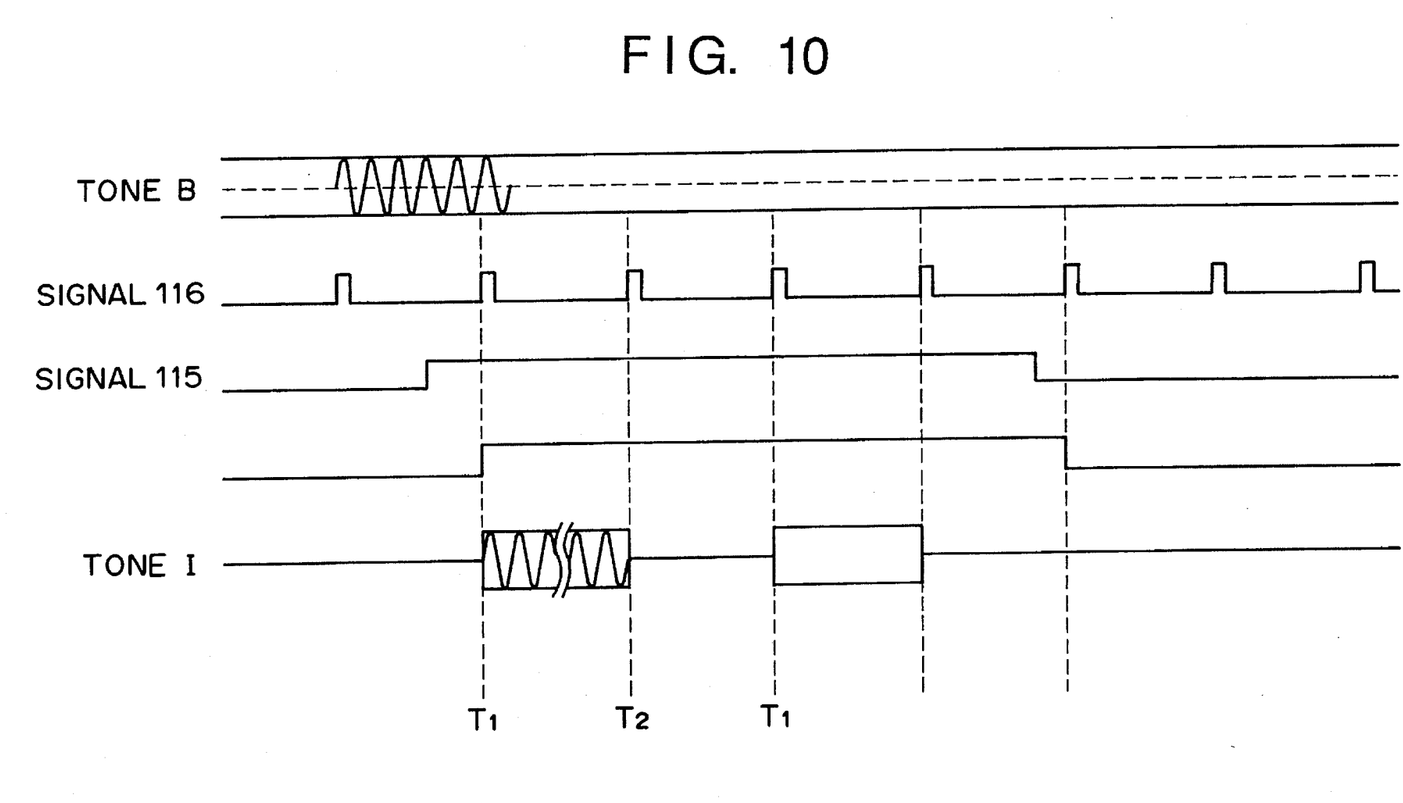
FIG. 10 is a timing chart the generation operation of the second tone signals in the second embodiment.

As a result of the above-mentioned processing, as shown in FIG. 10, a tone signal I is generated from the tone signal B. Since the switching timings $T_1$ and $T_2$ correspond to the zero-crossing points of the tone signal B, the tone signal I starts from zero-crossing point, and ends at zero-crossing point. The tone signal I is sent to the line interface 102 through the output PCM highway 117.

As described above, in the second embodiment, smooth tone signals free from unnecessary noise can be sent.

As described above, when the memory time switch is sequentially exchange-controlled in synchronism with the zero-crossing points of the first tone signals, all the second tone signals can be switched at the zero-crossing points. Therefore, the second tone signals can be generated as smooth signals including only a component within the audio band.

Since the second tone signals are switched in synchronism with their zero-crossing points when they are sent to corresponding output time slots, high-quality tones including no harmonic component and not causing an operator to feel discomfort can be sent.

Tones to be sent to the extension telephone set 112 include, e.g., a howler tone, a busy tone, and a ring back tone in addition to a dial tone.

A request for disconnecting a howler or busy tone is generated according to an on-hook operation of the extension telephone set 112. A request for disconnecting a ring back tone is generated according to an off-hook operation of the extension telephone set 112.

A request for connecting a howler tone is generated when an internal timer of the controller 104, which timer indicates that a state wherein the extension telephone set 112 is not connected to a called party continues for a predetermined period of time, reaches a time-up state. Note that the time-up state of the internal timer occurs independently of the timings $T_1$ and $T_2$ ($T_1$, $T_2$, $T_3$, and $T_4$). The internal timer may count the signals 116.

A request for connecting a busy tone is generated when the controller 104 determines that an extension telephone set corresponding to an extension number input from the extension telephone set 112 is busy. Note that this determination is also made independently of the timings $T_1$ and $T_2$ ($T_1$, $T_2$, $T_3$, and $T_4$).

A timing for generating a ring back tone is generated when the controller 104 detects that an incoming call to the extension telephone set 112 is generated. This detection is also made independently of the timings $T_1$ and $T_2$ ($T_1$, $T_2$, $T_3$, and $T_4$).

Tones to be sent to the exchange network 114 include, e.g., a PB signal. More specifically, when a PB tone type exchange network is called, or when an incoming message recorded in an automatic answering telephone set connected through the exchange network 114 is played back by a remote-control operation, a connection request of a PB tone is generated according to a dial input from the extension telephone set 112. This dial input is generated independently of the timings $T_1$ and $T_2$ ($T_1$, $T_2$, $T_3$, and $T_4$). A disconnection request of a PB tone is generated when the internal timer of the controller 104 counts a predetermined number of signals 116. The PB tone sent to the exchange network 114 is reflected by the line interface 102, and is sent to the extension telephone set 112.

The present invention has been described with reference to its preferred embodiments. However, the present invention is not limited to the arrangements of the embodiments, and various changes and modifications may be made within the scope of claims.

What is claimed is:

1. A telephone exchange apparatus for performing exchange processing, comprising:

first tone signal generation means for generating a plurality of first tone signals having different frequencies;

zero-crossing point signal generation means for generating a common zero-crossing point signal indicating a common zero-crossing point timing for the plurality of first tone signals generated by said first tone signal generation means; and time switching means for switching the plurality of first tone signals to obtain a plurality of second tone signals, in synchronism with the common zero-crossing point signal.

2. The apparatus according to claim 1, wherein upon reception of a tone signal sending request signal which requests said apparatus to send a tone signal, said time switching means sends the plurality of second tone signals in synchronism with the common zero-crossing point signal.

3. The apparatus according to claim 1, further comprising:

sending request signal generation means for generating a tone signal sending request signal which requests said apparatus to send a tone signal; and signal synchronization means for synchronizing the sending request signal generated by said sending request signal generation means with the common zero-crossing point signal generated by said zero-crossing point signal generation means, wherein said time switching means switches the plurality of first tone signals into the plurality of second tone signals in synchronism with the common zero-crossing point signal.

4. A telephone exchange apparatus for performing exchange processing by an exchange switch, comprising:

first tone signal generation means for generating a plurality of first tone signals having different frequencies;

first tone signal sending means for sending the first tone signals generated by said first tone generation means to said exchange switch;

zero-crossing point signal generation means for generating a common zero-crossing point signal indicating a common zero-crossing point of the plurality of first tone signals generated by said first tone signal generation means;

control means for generating a plurality of second tone signals by controlling said exchange switch in synchronism with the common zero-crossing point signal; and second tone signal sending means for sending the generated second tone signals onto a transmission path.

5. The apparatus according to claim 4, wherein upon reception of a tone signal sending request signal which requests said apparatus to send a tone signal, said control means generates the plurality of second tone signals by controlling said exchange switch in synchronism with the common zero-crossing point signal.

6. The apparatus according to claim 4, further comprising:

sending request generation means for generating a tone signal sending request signal which requests said apparatus to send a tone signal; and signal synchronization means for synchronizing the sending request signal generated by said sending request signal generation means with the common zero-crossing point signal generated by said zero-crossing point signal generation means, wherein said control means controls to re-input the second tone signal to said exchange switch, by transmitting, onto said transmission path, the second tone signal, which is re-input by controlling said exchange switch in synchronism with the common zero-crossing point signal.

7. A telephone exchange method for performing exchange processing, comprising the steps of:

generating a plurality of first tone signals having different frequencies;

generating a common zero-crossing point signal indicating a common zero-crossing point timing for the plurality of first tone signals; and switching the plurality of first tone signals to obtain a plurality of second tone signals, in synchronism with the common zero-crossing point signal.

8. The method according to claim 7, wherein, upon receiving a tone signal sending request signal which requests that a tone signal be sent, sending the plurality of second tone signals in synchronism with the common zero-crossing point signal.

9. The method according to claim 7, further comprising the steps of:

generating a tone signal sending request signal which requests that a tone signal be sent; and synchronizing the sending request signal with the common zero-crossing point signal.

10. A telephone exchange apparatus for performing exchange processing, comprising:

first tone signal generating means for generating a first tone signal;

zero-crossing point signal generation means for generating a zero-crossing point signal indicating a zero-crossing timing of the first tone signal generated by said first tone signal generating means;

time switching means for switching the first tone signal to obtain a second tone signal, in synchronism with the zero-crossing point signal; and reinputting means for reinputting the second tone signal repeatedly to said time switching means, wherein said time switching means outputs the reinputted second tone signal.

11. The apparatus according to claim 10, wherein upon reception of a tone signal sending request signal which requests said apparatus to send a tone signal, said time switching means sends the second tone signal in synchronism with the zero-crossing point signal.

12. The apparatus according to claim 10, further comprising:

sending request signal generation means for generating a tone signal sending request signal which requests said apparatus to send a tone signal; and signal synchronization means for synchronizing the sending request signal generated by said sending request signal generation means with the zero crossing point signal generated by said zero crossing point signal generation means, wherein said time switching means switches the first tone signal into the second tone signal in synchronism with the zero-crossing point signal.

13. The apparatus according to claim 10, wherein said first tone signal generating means generates a plurality of first tone signals having different frequencies, said zero-crossing point signal generation means generates a common zero-crossing point signal indicating a common zero-crossing timing for the plurality of first tone signals and said time switching means converts the plurality of first tone signals into a plurality of second tone signals in synchronism with the common zero-crossing point signal.

14. A telephone exchange method for performing exchange processing, comprising the steps of:

generating a first tone signal;

generating a zero-crossing point signal indicating a zero-crossing timing of the first tone signal;

switching the first tone signal, to obtain a second tone signal;

reinputting the second tone signal repeatedly to said time switching means; and outputting the reinputted second tone signal by said time switching means.

15. The method according to claim 14, wherein, upon receiving a tone signal sending request signal which requests that a tone signal be sent, sending the second tone signal in synchronism with the zero-crossing point signal.

16. The method according to claim 14, further comprising the steps of:

generating a tone signal sending request signal which requests that a tone signal be sent;

synchronizing the sending request signal with the zero crossing point signal; and switching the first tone signal into the second tone signal in synchronism with the zero-crossing point signal.

17. The telephone exchange method according to claim 14, further including the steps of generating a plurality of first tone signals having different frequencies, generating a common zero-crossing point signal indicating a common zero-crossing timing for the plurality of first tone signals and switching the plurality of first tone signals into a plurality of second tone signals in synchronism with the common zero-crossing point signal.

* * * * *